(No Model.) 4 Sheets—Sheet 1.

G. M. HINKLEY.
COMBINED BAND AND CIRCULAR SAW MILL.

No. 348,281. Patented Aug. 31, 1886.

(No Model.) 4 Sheets—Sheet 2.
G. M. HINKLEY.
COMBINED BAND AND CIRCULAR SAW MILL.
No. 348,281. Patented Aug. 31, 1886.

Attest.
Sidney P. Hollingsworth
Walter S. Dodge.

Inventor.
George M. Hinkley
by Dodgeson
his Attys (No Model.) 4 Sheets—Sheet 3.
G. M. HINKLEY.
COMBINED BAND AND CIRCULAR SAW MILL.
No. 348,281. Patented Aug. 31, 1886.
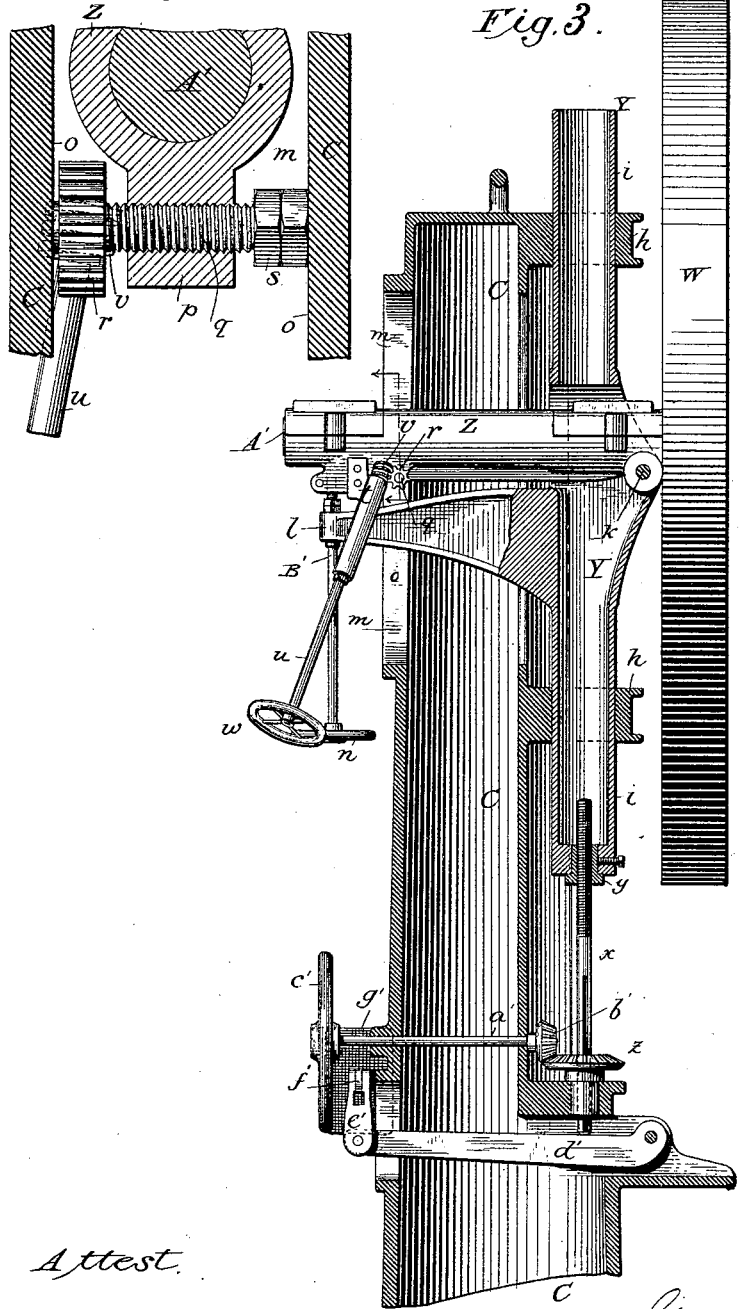

(No Model.) 4 Sheets—Sheet 4.

G. M. HINKLEY.
COMBINED BAND AND CIRCULAR SAW MILL.

No. 348,281. Patented Aug. 31, 1886.

Attest. Inventor.
Sidney P. Hollingsworth George M. Hinkley
Walter F. Dodge. by Dodge & Son,
his Attys.

UNITED STATES PATENT OFFICE.

GEORGE M. HINKLEY, OF MILWAUKEE, WISCONSIN, ASSIGNOR OF ONE-HALF TO EDWARD P. ALLIS, OF SAME PLACE.

COMBINED BAND AND CIRCULAR SAW MILL.

SPECIFICATION forming part of Letters Patent No. 348,281, dated August 31, 1886.

Application filed April 6, 1886. Serial No. 198,002. (No model.)

*To all whom it may concern:*

Be it known that I, GEORGE M. HINKLEY, of Milwaukee, in the county of Milwaukee and State of Wisconsin, have invented certain new and useful Improvements in Combined Band and Circular Saw Mills, of which the following is a specification.

My invention relates to that class of sawmills in which a circular saw and a band-saw are combined in one frame and occupy a common vertical plane between the frame-work and the movable saw-mill carriage; and this invention consists in a novel construction of the saw-driving and carriage-feeding mechanism, in a novel construction of devices for tipping or otherwise varying the position of the upper saw-carrying wheel, and in various other features and details of construction hereinafter set forth.

Figure 1:
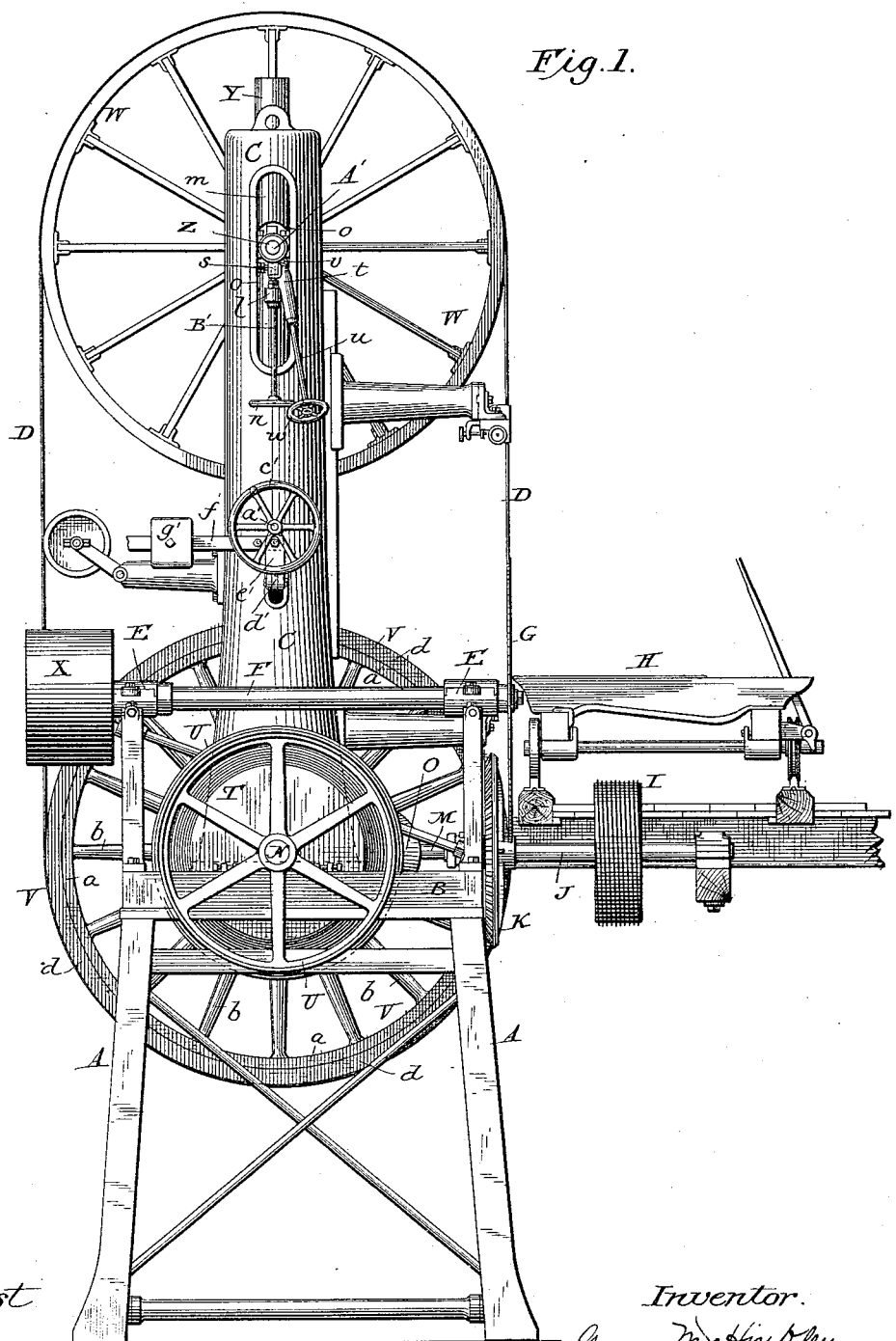
Figure 2:
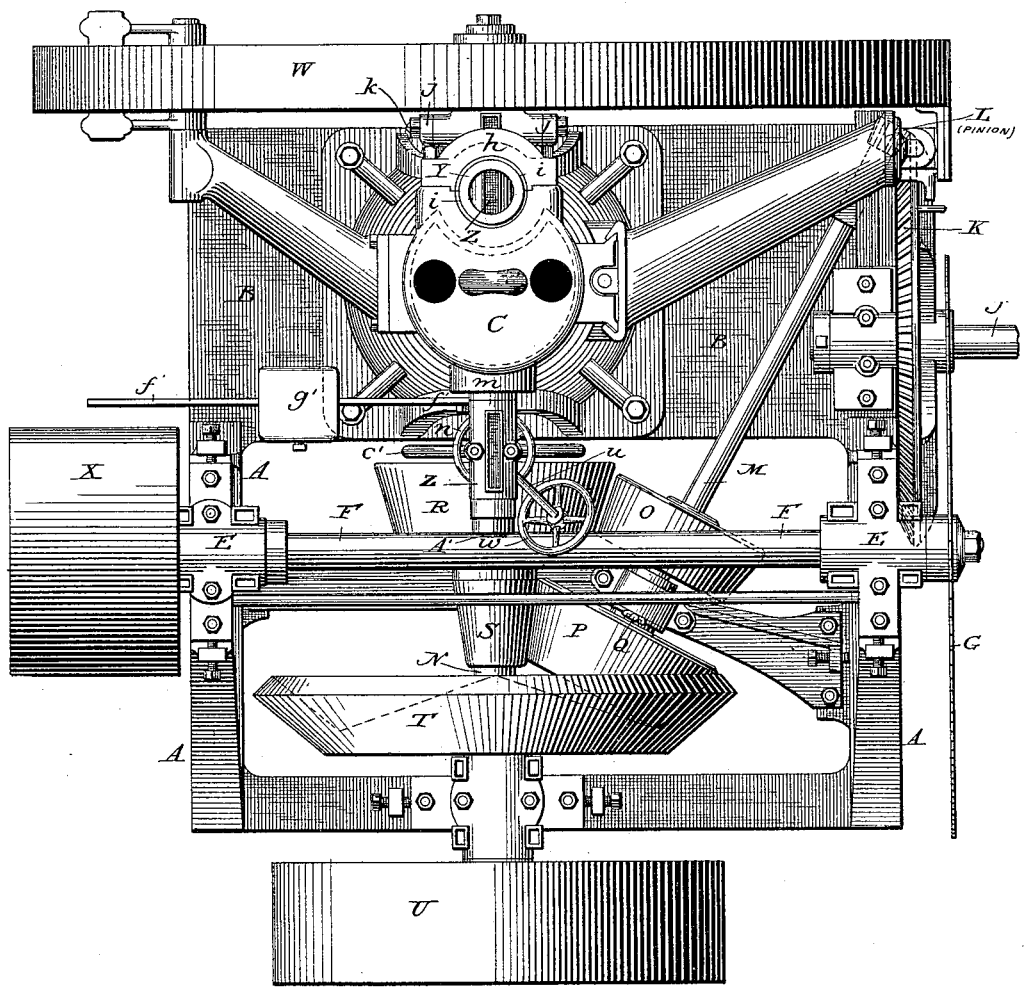
Figure 6:
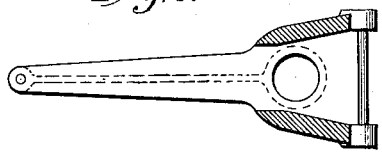
Figure 7:
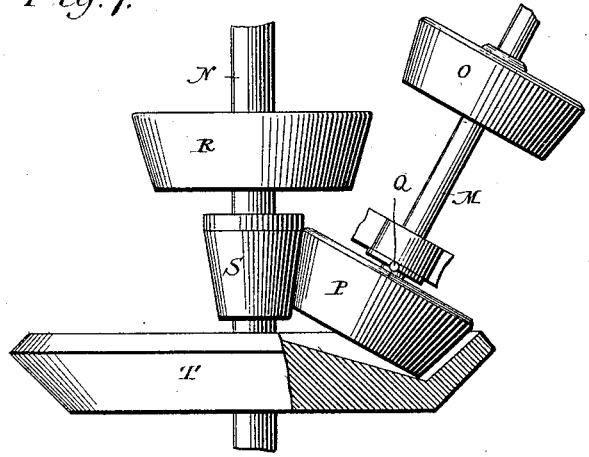
Figure 8:
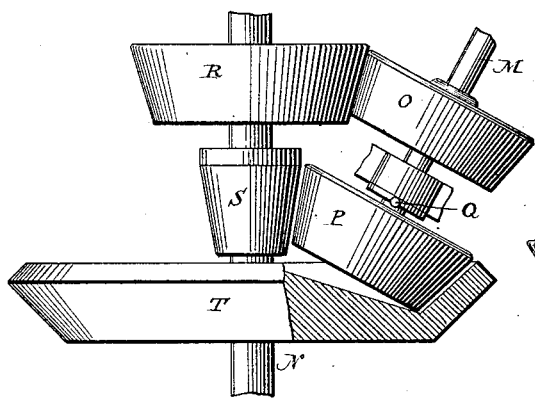
Figure 9:
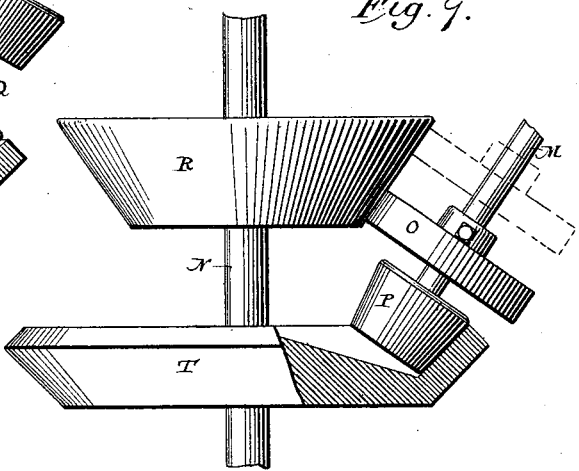

In the drawings, Figure 1 is a side elevation of a saw-mill constructed in accordance with my invention; Fig. 2, a top plan view; Fig. 3, a vertical central section through the upright standard, showing the mechanism by which the upper wheel is adjusted; Figs. 4, 5, and 6, views showing certain details relating to the wheel-adjusting devices; Figs. 7 and 8, views illustrating the friction gear; Fig. 9, a view showing a slight modification.

A indicates a substantial framing, on the top of which is secured the platform B, the latter supporting the upright column or standard C for the band-saw D, and also the brackets E for the shaft F of the circular saw G, as shown in Fig. 2.

As shown in Fig. 1, H indicates the saw-mill carriage, and I the drum beneath the same, which receives the rope or cable by which the carriage is reciprocated, the drum I being mounted upon and receiving motion from a shaft, J, having at its end a large bevel-gear wheel, K.

The bevel-gear K meshes with a small pinion, L, on a shaft, M, journaled on the platform B or in frame A, the shaft M receiving motion through intermediate gear on a main shaft, N, journaled in bearings on the platform, as shown in Figs. 1 and 2.

Shaft M is provided with two bevel-gears, O P, and is supported at a point between them in an eccentric-bearing mounted in a bridge-tree and provided with a hand-lever, Q, as shown in Fig. 2. This construction is not claimed herein, however, as it forms the subject-matter of another application filed by me March 25, 1886, Serial No. 196,450.

Shaft N is provided with two bevel-gears, R S, a hollow or internal gear, T, and a band-wheel, U, as shown in Figs. 2, 7, and 8.

The gears O P on shaft M are so arranged as to run in contact with the gears R S, the gears O S being respectively smaller than the gears R P, so that a change in speed of rotation of the shaft M may be effected as desired.

The gear P on the end of shaft M projects inward between the outer face of the bevel-gear S and the inner face of gear T, and is so arranged as to be capable of running in contact with either of the gears S T at will; or it may occupy an intermediate position and not touch either of them.

When the band-saw is used alone, the circular saw is dismounted and the gearing arranged as shown in Fig. 7—that is to say, the gear O is slipped along its shaft toward the pinion L, so that it (the gear O) may not touch the gear R, whereupon the gears S and P are allowed to touch. When motion is imparted to the driving-shaft N, it is transmitted through bevel-gears S P to shaft M, and from the latter to shaft J and to the carriage, the shaft N of course transmitting motion to the band-saw D through its wheel V, which is rigidly secured to shaft N. The motion transmitted to shaft M is, comparatively speaking, slow, as the driving-gear S is much smaller than the driven gear P.

When a cut is completed preparatory to gigging back, the hand-lever Q is thrown over to one side, and shaft M moved so as to bring the gear P into contact with the inner face of gear T, and consequently to reverse the motion of shaft M and the carriage; but when ready to feed forward for a new cut the hand-lever Q is thrown back to its former position, and brings the gears S P into contact again, causing the proper feed of the carriage.

When it is desired to use the circular saw alone, the band-saw is disconnected and the gearing arranged as shown in Fig. 8, in which it will be seen that the gear O is moved along its shaft M in contact with gear R, so far as not to allow the gears S P to touch. The motion transmitted from shaft N to shaft M through the gears R O will be much more rapid than under the arrangement shown in Fig. 7, as the driving-gear R in this instance is larger than the driven one, O. The shifting of the shaft M, to bring the gear P into contact with wheel T, is performed in this connection the same as when the arrangement shown in Fig. 7 is used.

When the gear P is in contact with the wheel T, to effect gigging back, it will of course be seen that the gears O and R or S and P must not be in contact, as they would counteract each other.

The gears O, P, R, S, and T may be toothed gears or friction-gears, and of any style or form and material.

Motion is transmitted to the circular saw G by means of a band-wheel, X, secured to its shaft F, as shown in Figs. 1 and 2.

Instead of the arrangement shown in Figs. 7 and 8, that shown in Fig. 9 may be adopted. In this plan the second gear, S, is dispensed with, the gear R elongated, and gear O made with plane faces, so that by sliding the gear O along the shaft M the feed of the carriage may be varied as desired.

In Figs. 1 and 2, and more particularly Figs. 3, 4, and 5, the mechanism for varying the position of the upper saw-carrying wheel, W, is shown. The standard or upright C is hollow, and is provided on its front face with boxes or bearings $h$, which are adapted to receive and support the crane Y, carrying the upper wheel, W, as shown in Fig. 3, the crane being turned off to form cylindrical vertical arms or journals $i$, as shown in Figs. 3 and 5. At or about its center the crane is forked to form arms $j$, as shown in Figs. 5 and 6, between which is pivoted, by means of a bolt, $k$, the tubular sleeve or bearing Z, supporting the shaft A', the bearing-sleeve being pivoted near its forward end just behind the wheel W, and the crane being swelled out or enlarged at that point to give the proper offset to the wheel. The crane Y is provided with a tail or rearward extension, $l$, which projects out through an opening, $m$, in the rear of the column, beneath the sleeve Z, as shown in Fig. 3. A screw, B', provided at its lower end with a hand-wheel, $n$, is journaled in the tail or extension $l$, and screws into a lug on the under side of the tubular sleeve Z. The screw B' is prevented from moving lengthwise in the tail $l$; and it will be seen that as the screw is turned in one or the other direction the sleeve will be raised and lowered vertically upon the bolt $k$ as a pivot, thus tipping the top wheel forward or back, and giving the saw more strain on the front or back edge, as may be required. The vertical walls of the opening $m$ in the rear of the column C are planed to form perpendicular bearing-faces $o$. Upon the under side of the sleeve Z is formed a lug, $p$, which is threaded to receive a screw, $q$, as shown in Fig. 4, the screw being provided on opposite sides of the lug $p$ with a gear-wheel, $r$, and a jam-nut, $s$. The screw $q$ bears at one end against one of the planed faces $o$, while at the other end one of the jam-nuts $s$ bears against the upright wall. By means of the jam-nuts the screw is held firmly between the upright walls $o$, and prevents lateral play of the sleeve.

As shown in Fig. 3, a bracket, $t$, is bolted or otherwise secured to the side of sleeve Z, and in said bracket is journaled a rod or stem, $u$, carrying at one end a worm, $v$, and at the other end a hand-wheel, $w$, the stem or rod $u$ being capable of rotating, but not moving longitudinally through the bracket.

It will be noticed that the worm $v$ meshes with the pinion $r$ on the screw $q$, and of course as the worm $v$ is turned it rotates the pinion $r$ and the screw.

As the screw is prevented from moving lengthwise, its rotation causes the travel of the sleeve Z in one or the other direction, according to the direction of rotation of the hand-wheel $w$. By this operation I am enabled to cause the upper wheel to assume a cross-lined position relative to the lower wheel.

The object of cross-lining the wheels is to cause the saw to assume any desired position on the wheels that may be necessary—as, for instance, if the top wheel is cross-lined one way the saw will run farther to the front sufficiently to overcome the pressure of the log being fed to it, and if cross-lined in the other direction the saw will run back on the wheels.

By my construction I am enabled to move the rear end of the sleeve to the right or left and to cross-line the upper wheel to a greater or less degree, as may be necessary. In thus cross-lining the wheel W the crane Y turns on its journals $i$.

In order to raise or lower the crane Y bodily, to stretch or tighten the saw, I use a screw-stem, $x$, which fits into a nut or block, $y$, in the lower end of the crane, as shown in Fig. 3. The screw-stem $x$ passes through a bevel-pinion, $z$, journaled in the column C, and is internally grooved to receive a feather or spline on the pinion $z$. By this construction the screw-stem and pinion are caused to rotate together; but the former may slide vertically through the latter, as desired. Motion is imparted to the gear-wheel $z$ and screw-stem $x$ by means of a shaft, $a'$, extending through the frame, provided at one end with a bevel-gear, $b'$, to mesh with gear $z$, and at the other end with a hand-wheel, $c'$, as shown in Figs. 1 and 3. From this description it will be seen that by turning the hand-wheel $c'$ in one or the other direction the screw-stem $x$ is caused to raise or lower the crane bodily. The stem projects down through the gear-wheel $z$ and bears upon the upper edge of a pivoted lever, $d'$, as shown in Fig. 3, the lever $d'$ being connected by a link, $e'$, with a second lever, $f'$, which is provided with a counter-weight, $g'$. By reason of this construction the weighted lever maintains a constant strain or tension on the saw and compensates for any expansion or contraction thereof.

It will be observed that my devices are exceedingly simple in construction and operation, and that there are no loose joints which would cause or permit vibration of the wheel and consequent uneven sawing.

I am aware that it is not new to provide a saw-mill carriage with a variable feed, so that it shall move faster in gigging back than during the cut, and I make no broad claim thereto.

Under my plan, while I cause the carriage to gig back faster than it moves forward, as is usual, I also am enabled to vary the feed in cutting, according to whether the band-saw or the circular saw be used, and this latter feature I believe to be new.

Having thus described my invention, what I claim is—

1. In a combined band and circular saw mill, the combination, with a frame-work and a carriage movable past the same, of a main driving-shaft mounted thereon and provided with gear-wheels, a second shaft also mounted on the frame-work connected with the traveling carriage, and provided with differential gear-wheels adapted and arranged to mesh with either of those on the main shaft, as required, whereby the "feed" of the carriage may be varied to suit the kind of saw used.

2. In a combined band and circular saw mill, the combination, with a frame-work and a log-carriage movable past the same, of a main driving-shaft, N, provided with gears R, S, and T, a second shaft, M, connected at one end with the carriage and provided at its other end with gears O P, the gear O being arranged, substantially as shown, to allow or prevent the touching of wheels S P.

3. In a combined band and circular saw mill, the combination of a main driving-shaft, N, and bevel-gears R T, secured thereto, a second shaft, M, connected with the traveling carriage, provided with a fixed gear, P, to mesh with gear T and effect the gigging back of the carriage, and a sliding gear, O, to mesh with the bevel-gear R, whereby the feed of the carriage may be varied by sliding the pinion O upon its shaft.

4. In a combined band and circular saw mill, the combination, with a frame-work and a carriage movable past the same, of a main shaft provided with two bevel-gears, a carriage-operating shaft provided with two gears adapted to engage with those of the main shaft, and a device, substantially such as shown, for throwing either of the gears on the carriage-shaft into engagement with its respective gear on the main shaft.

5. In a combined band and circular saw mill, in combination with a frame-work and a log-carriage movable past the same, a main shaft, N, and a carriage-operating shaft, M, a gear, T, upon the main shaft for moving the carriage when gigging back, a gear, P, upon the carriage-shaft to engage with the gear T, a bevel gear-wheel, as R, upon the main shaft, and a gear, O, upon the carriage-shaft, arranged and operating, substantially as shown, to produce a variable feed in one direction according to the kind of saw used, and a uniform feed in the reverse direction regardless of the saw used.

6. In a combined band and circular saw mill, in combination with a frame-work and a log-carriage movable past the frame-work, a main driving-shaft, a carriage-operating shaft, both mounted upon the frame-work, a bevel-gear for imparting motion to the carriage-shaft in gigging back, and a variable gear mounted upon the carriage-shaft and adapted to receive motion from the main shaft, substantially as explained, whereby the speed of the carriage may be increased or decreased when running in one direction and may remain constant when running in the reverse direction.

7. In a band-saw mill, the combination, with an upright, of a crane, as Y, provided with vertical journals and mounted in the upright, a saw-wheel shaft mounted horizontally in said crane, and mechanism, substantially such as shown, for moving said crane horizontally on its vertical journals, whereby the wheel may be cross-lined, as desired.

8. In a band-saw mill, the combination of an upright having an opening, m, in the rear thereof, a crane, Y, journaled vertically in the upright and provided with sleeve Z, shaft A', journaled in said sleeve, screw q, passing transversely through the sleeve and abutting at its ends against the walls of opening m, a pinion, r, on the screw, a bracket, t, secured to the sleeve Z, and a worm, v, swiveled in the bracket and meshing with the pinion r, whereby as the worm v is rotated in one or the other direction the sleeve will be moved to the right or left.

9. In a band-saw mill, the combination of an upright, an opening in the rear thereof, a crane, Y, journaled vertically in the upright and provided with a tail or extension, a sleeve carrying the saw-wheel and pivoted near the front end in the crane, and a set-screw swiveled in the tail of the crane, engaging with the sleeve, and serving to raise and lower the rear end of the sleeve and tip the top of the wheel outward or inward, as desired.

10. In a band-saw mill, the combination, with an upright, C, having an opening, m, in the rear thereof, a crane journaled vertically in the upright and provided with tail l, wheel W, and shaft A', of sleeve Z, carrying shaft A' and pivoted near its front end, screw B', swiveled in the tail or extension l and screwing into the rear end of the sleeve Z, substantially as described and shown.

11. In a band-saw mill, the combination of an upright, C, and bearings h h, secured thereto, crane Y, journaled vertically therein and supporting the upper saw-carrying wheel, a nut, y, in the lower end thereof, a screw, x, provided with bevel-gear z and journaled in the upright, a shaft, a', also journaled in the upright and provided with a bevel-gear, $b'$, to mesh with the gear $z$, as and for the purpose set forth.

12. In a band-saw mill, the combination, with an upright, of a crane journaled therein and supporting the upper saw-wheel, a screw-stem for raising and lowering the crane, bearing at its lower end on a pivoted lever and adapted to rise and fall, and a counterweighted lever connected with the first lever and tending to exert a constant strain upon the saw, as described.

13. In a band-saw mill, the combination of an upright, a crane journaled vertically therein, a shaft mounted horizontally in the crane, a saw-supporting wheel carried by said shaft at one end, a screw for raising and lowering the other end of the shaft, a screw for moving the crane and wheel bodily up and down, and a screw for moving them horizontally, as and for the purpose set forth.

14. In a band-saw mill, the combination of an upright, a crane journaled therein and movable vertically and horizontally in relation thereto, a sleeve pivoted at its forward end in the crane carrying the upper band-saw wheel and adjustable vertically at its rear end.

GEORGE M. HINKLEY.

Witnesses:
WM. W. ALLIS,
EDW. P. ALLIS.